(12) United States Patent
Shamma

(10) Patent No.: US 11,463,490 B2
(45) Date of Patent: Oct. 4, 2022

(54) SYNCHRONOUS DELIVERY OF MEDIA CONTENT IN A COLLABORATIVE ENVIRONMENT

(71) Applicant: Match Group, LLC, Dallas, TX (US)

(72) Inventor: David A. Shamma, San Francisco, CA (US)

(73) Assignee: Match Group, LLC, Dalias, TX (US)

( * ) Notice: Subject to any disclaimer, the term of this patent is extended or adjusted under 35 U.S.C. 154(b) by 0 days.

(21) Appl. No.: 17/149,847

(22) Filed: Jan. 15, 2021

(65) Prior Publication Data

US 2021/0243236 A1    Aug. 5, 2021

Related U.S. Application Data

(63) Continuation of application No. 16/408,785, filed on May 10, 2019, now Pat. No. 10,924,521, which is a
(Continued)

(51) Int. Cl.
*H04L 65/401* (2022.01)
*H04L 67/104* (2022.01)
(Continued)

(52) U.S. Cl.
CPC ........ *H04L 65/4015* (2013.01); *H04L 51/046* (2013.01); *H04L 51/18* (2013.01);
(Continued)

(58) Field of Classification Search
None
See application file for complete search history.

(56) References Cited

U.S. PATENT DOCUMENTS

| 925,322 A | 6/1909 | Flora et al. |
| D403,313 S | 12/1998 | Peppel |

(Continued)

FOREIGN PATENT DOCUMENTS

| KR | 1020060026409 | 3/2006 | |
| WO | 2004104758 A3 | 2/2007 | |
| WO | WO-2007079334 A2 * | 7/2007 | ....... H04L 29/06027 |

OTHER PUBLICATIONS

"Clipsync Mashable!—The Social Networking Blog," (2006) located at, last visited on Mar. 13, 2007, 9 pages.
(Continued)

*Primary Examiner* — Jeffrey R Swearingen
(74) *Attorney, Agent, or Firm* — Patent Capital Group

(57) ABSTRACT

An apparatus and method for facilitating a synchronous display of a time-based media object (e.g., a video or audio file) with a remote device is provided. In one example, the apparatus comprises control logic for controlling the display of a media object in response to a user entered command with a first device, and communication logic for causing communication of the user entered command (e.g., play, pause, skip, etc.) and a metric (e.g., time or frame reference) associated with the media object to a second device for synchronizing the display of the media object with the first and second devices. The first and second devices may communicate via peer-to-peer communications, for example, in a collaborative or social application such as an IM application. Further, the apparatus may include various devices such as a personal computer, mobile phone device and/or mobile personal entertainment device, DVR, or the like.

27 Claims, 5 Drawing Sheets

Related U.S. Application Data continuation of application No. 14/966,544, filed on Dec. 11, 2015, now Pat. No. 10,333,999, which is a continuation of application No. 11/710,026, filed on Feb. 22, 2007, now Pat. No. 9,253,222.

(51) Int. Cl.

| | | |
|---|---|---|
| *H04L 65/613* | (2022.01) | |
| *H04L 51/046* | (2022.01) | |
| *H04L 51/18* | (2022.01) | |
| *H04N 21/242* | (2011.01) | |
| *H04N 21/4147* | (2011.01) | |

(52) U.S. Cl.
CPC .......... *H04L 65/613* (2022.05); *H04L 67/104* (2013.01); *H04N 21/242* (2013.01); *H04N 21/4147* (2013.01)

(56) References Cited

U.S. PATENT DOCUMENTS

| | | | |
|---|---|---|---|
| 6,105,055 | A | 8/2000 | Pizano et al. |
| D454,139 | S | 3/2002 | Feldcamp |
| D476,339 | S | 6/2003 | Horie |
| D521,017 | S | 5/2006 | Jewitt et al. |
| D523,440 | S | 6/2006 | Hernandez et al. |
| D526,654 | S | 8/2006 | McDougall et al. |
| D527,736 | S | 9/2006 | McDougall et al. |
| 7,292,588 | B2 | 11/2007 | Milley et al. |
| D565,627 | S | 4/2008 | Kase |
| D569,873 | S | 5/2008 | Borovsky |
| 7,395,508 | B2 | 7/2008 | Hintermeister et al. |
| 8,661,481 | B2 | 2/2014 | Maynard et al. |
| 8,739,234 | B1 | 5/2014 | Cheung et al. |
| 2003/0236835 | A1 | 12/2003 | Levi et al. |
| 2004/0143603 | A1 | 7/2004 | Kaufmann et al. |
| 2005/0021624 | A1 | 1/2005 | Herf et al. |
| 2005/0021652 | A1 | 1/2005 | McCormack |
| 2005/0286546 | A1* | 12/2005 | Bassoli ............. G11B 27/105 370/432 |
| 2006/0002681 | A1 | 1/2006 | Spilo et al. |
| 2006/0064472 | A1 | 3/2006 | Mirho |
| 2006/0161621 | A1 | 7/2006 | Rosenberg |
| 2006/0236352 | A1 | 10/2006 | Scott |
| 2007/0050371 | A1 | 3/2007 | Johnson et al. |
| 2007/0255788 | A1 | 11/2007 | Troung |
| 2007/0271338 | A1 | 11/2007 | Anschutz |
| 2008/0010380 | A1 | 1/2008 | Whitehead et al. |
| 2008/0016155 | A1 | 1/2008 | Khalatian |
| 2008/0028314 | A1 | 1/2008 | Bono et al. |
| 2008/0046803 | A1 | 2/2008 | Beauchamp et al. |
| 2008/0209021 | A1 | 8/2008 | Shamma |
| 2008/0209075 | A1 | 8/2008 | Shamma |
| 2016/0099987 | A1 | 4/2016 | Shamma |
| 2021/0297466 | A1 | 9/2021 | Shamma |
| 2021/0320954 | A1 | 10/2021 | Shamma |

OTHER PUBLICATIONS

"Clipsync ver 0.5.9," (2006) Screen print, located at, last visited on Mar. 13, 2007, 1 page.

Clipsync.com. (2006). "A New Way to Watch Online Videos & Chat with Friends," located at , last visited on Mar. 13, 2007, 2 pages.

Final Office Action in U.S. Appl. No. 11/710,026 dated Apr. 12, 2010, 14 pages.

Final Office Action in U.S. Appl. No. 11/710,026 dated Nov. 19, 2014, 16 pages.

Final Office Action in U.S. Appl. No. 14/966,544 dated Apr. 9, 2018. 12 pages.

Final Office Action in U.S. Appl. No. 16/408,785 dated Feb. 10, 2020, 8 pages.

Gannes, L. (Dec. 12, 2006). "Clipsync Launches Video Screening Rooms," located at, last visited on Mar. 13, 2007, 4 pages.

Hoyos-Rivera et al. Collaborative Web Browsing Tool supporting Audio/Video Interactive Presentations. May 2005,, 6 pages.

International Search Report dated Jun. 25, 2009, for PCT Application PCT/US2008/054619, filed Feb. 21, 2008, 6 pages.

Korean Patent Office Final Rejection in Korean Patent Application Serial No. 10-2009-701966 dated Nov. 28, 2011, 2 pages.

Korean Patent Office Preliminary Rejection in Korean Patent Application Serial No. 10-2009-701966 dated Apr. 10, 2011, 4 pages.

Non Final Office Action in U.S. Appl. No. 11/710,026 dated Jul. 10, 2014, 15 pages.

Non Final Office Action in U.S. Appl. No. 11/710,026 dated Oct. 5, 2009, 14 pages, 14 pages.

Non Final Office Action in U.S. Appl. No. 14/966,544 dated Apr. 27, 2017, 11 pages.

Non Final Office Action in U.S. Appl. No. 14/966,544 dated Nov. 22, 2017, 12 pages.

Non Final Office Action in U.S. Appl. No. 14/966,544 dated Oct. 2, 2017, 12 pages.

Non Final Office Action in U.S. Appl. No. 16/408,785 dated Aug. 28, 2019, 15 pages.

Notice of Allowance in U.S. Appl. No. 11/710,026 dated Sep. 28, 2015, 15 pages.

Notice of Allowance in U.S. Appl. No. 14/966,544 dated Mar. 20, 2019, 11 pages.

Notice of Allowance in U.S. Appl. No. 16/048,785 dated Oct. 15, 2020, 7 pages.

Schroeter et al. FilmEd—Collaborative Video Indexing, Annotation and Discussion Tools Over Broadband Networks. Jul. 2004, 8 pages.

Written Opinion dated Jun. 25, 2009, for PCT Application PCT/US2008/054619, filed Feb. 21, 2008, 4 pages.

\* cited by examiner

SYNCHRONOUS DELIVERY OF MEDIA CONTENT IN A COLLABORATIVE ENVIRONMENT

CROSS-REFERENCE TO RELATED APPLICATIONS

This Application is a continuation (and claims the benefit of priority under 35 U.S.C. § 120) of U.S. application Ser. No. 16/408,785, filed May 10, 2019, and entitled "SYNCHRONOUS DELIVERY OF MEDIA CONTENT IN A COLLABORATIVE ENVIRONMENT" which is a continuation of U.S. application Ser. No. 14/966,544, filed Dec. 11, 2015, and entitled "SYNCHRONOUS DELIVERY OF MEDIA CONTENT IN A COLLABORATIVE ENVIRONMENT", now U.S. Pat. No. 10,333,999, which is a continuation of U.S. application Ser. No. 11/710,026, filed Feb. 22, 2007, now U.S. Pat. No. 9,253,222, and entitled "SYNCHRONOUS DELIVERY OF MEDIA CONTENT IN A COLLABORATIVE ENVIRONMENT." The disclosures of the prior Applications are considered part of and are incorporated by reference in the disclosure of this Application.

BACKGROUND

Field

The present invention relates generally to systems and methods for the display and control of time-based media content such as video and/or audio content via a network, such as the Internet or an intranet, and in particular, to an interface and method for synchronously displaying and controlling time-based media content in a collaborative environment

Description of Related Art

Sharing time-based media content (e.g., video or audio files) within a social or collaborative environment such as an instant messaging environment can be arduous. For instance, typically, users may share references (e.g., send links/URLs) to media objects with each other within a conversation window of an instant messaging application (or other social or collaborative environment). These actions, however, do little for synchronizing the display and control of the media object for conversational feedback as each user independently controls the display (e.g., stops, pauses, etc.). For example, when sharing a media object, it is typically desirable to converse and share reactions in more or less real time with the other users. When a video URL is sent during an instant messaging conversation, however, the sender and receiver often have difficulty in conversing efficiently regarding the media object because of a lack of synchronization of the display of the media object, leading to questions such as "is it playing?" or "let me know when you get past the part with the mountains?"

Additionally, controlling the display of time-based media content within a social or collaborative environment presents difficulties for use. For example, even if users coordinate the initiation of playing a media object, controlling the display of the media object by one user device, e.g., pausing or rewinding a shared video by one user, may result in the shared video falling out of synchronization with the other user devices.

Accordingly, there is a desire to synchronously deliver and share time-based media content, such as audio and/or video, among a community of users. In addition, there is a desire to permit real-time control of such media by more than one member of the community in a synchronous manner.

SUMMARY

According to one aspect and one example of the present invention, a system and apparatus for facilitating a synchronous display of a time-based media object (e.g., a video or audio file) with a remote device is provided. In one example, the apparatus comprises control logic for controlling the display of a media object in response to a user entered command with a first device, and communication logic for causing communication of the user entered command and a metric (e.g., time or frame reference) associated with the media object to a second device for synchronizing the display of the media object with the first and second devices.

The communication logic may further receive a user entered command and metric from the second device, the control logic controlling the display of the media object with the first device based on the received command and metric. Accordingly, in one example, all user devices sharing the media object may enter commands for controlling the synchronized display of the media object with all of the user devices.

In one example, the first and second devices may communicate via peer-to-peer communications, and further the apparatus may be operable to add synchronization control of the media object to a communications channel between two or more user devices. Further, in one example, the apparatus may leverage from existing instant messaging applications (including existing buddy lists, profile information, and so on).

The user entered commands may include play, pause, rewind/forward, seek, and the like. The user entered commands may be communicated in response to user selections of control buttons associated with a displayed interface or commands entered into an associated instant messaging conversation. Further, the apparatus may include various devices such as a personal computer, mobile phone device and/or mobile personal entertainment device, DVR, or the like.

Accordingly, in some examples described here, the invention provides a web-based framework for sharing media objects between a plurality of users. Software (or other logic) located on each user's device creates a communications channel between the user devices to synchronously deliver a user-specified media object. Any user may control the playback and display of the media in real-time by, for example, stopping, fast-forwarding, or playing the media object in slow motion. Because the media is synchronized between the user devices, each user device screen displays the same segment of the media at the same time. Thus, the invention may aid collaborative communication through the presentation of synchronized media.

According to another aspect, a method for facilitating synchronous display of a time-based media object with multiple devices. In one example the method includes controlling the display of a media object in response to a user entered command with a first device, and causing communication of the user entered command and a metric associated with the media object to a second device for synchronizing the display of the media object with the first and second devices.

According to another aspect, a computer-readable medium comprising instructions for facilitating synchronous display of a time-based media object with multiple devices is provided. In one example, the instruction are for controlling the display of a media object in response to a user entered command with a first device, and causing communication of the user entered command and a metric associated with the media object to a second device for synchronizing the display of the media object with the first and second devices.

The present invention and its various aspects are better understood upon consideration of the detailed description below in conjunction with the accompanying drawings and claims.

DETAILED DESCRIPTION

Figure 1:
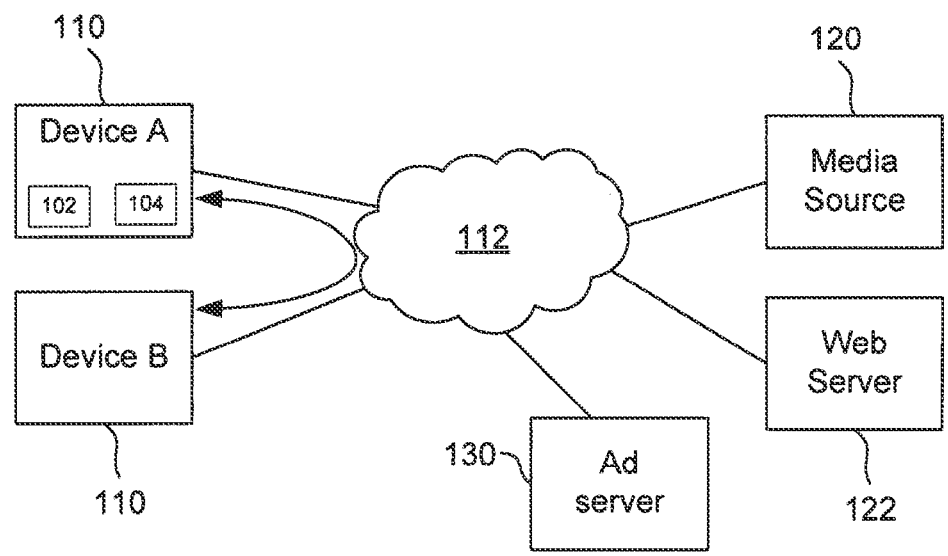
FIG. 1 schematically illustrates an exemplary system and environment for communication between two user devices for sharing media content such as time-based media objects.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

According to one aspect of the present invention, an apparatus and interface are provided for sharing time-based content (e.g., a media object) in a near-synchronous manner. In one example, software (or other logic) located on a user device creates a communication channel between at least one other user device for the synchronous display and control of user specified media content. The media content may comprise various media objects such as one or more audio and/or video files accessible (locally or remotely) by at least one of the user devices. In addition, the media content may be provided by a third party.

In one example, each user desiring to share media content accesses logic, e.g., software, that causes the display of an interface for facilitating the synchronous delivery of media content between the user devices. The software may be executed locally on the user's system, e.g., a plug-in or applet downloaded or installed on a user device, or remotely, e.g., a servlet through a web browser. Further, software, located either locally or remotely, facilitates a direct or indirect connection between users desiring to share media content. For example, a direct IP to IP (peer-to-peer) connection may be created between the user devices or an indirect connection may be created through a server that streams the media content. In both cases, a communicative connection is established between the user devices to synchronize the display and control of a shared media object.

A user desiring to share media content may communicate a reference such as a Uniform Resource Identifier (URI) associated with the media object to one or more user devices. Based on the URI, each user device may establish a synchronous exchange. The software ensures that each user is viewing the same, or substantially the same, segment of the media content at all times. For example, signals may be sent between the user's indicating the current position of the media object. The position may comprise a frame number, a time interval, or any other metric capable of ensuring synchronization between the users.

After the connection is established between the user devices, each user may control the media content via an interface displayed at each user device. For example, if one user enters a command, e.g., to pause a video, the command and a time reference will be communicated to the other user device to pause the video at the same position for all users sharing the video. In addition, if one user desires to jump to a particular segment or position of the media object, the jump and time are communicated to all users and they are correspondingly directed to the same segment or position of the media object.

In accordance with some examples, other forms of communications, such as instant messaging, audio and/or video conferencing, may operate in conjunction with the described interface. In these examples, users sharing media content may control the playback of the media and collaborate through other forms of communications. Additionally, in one example, the invention may be implemented for an instant messaging service that permits users to type commentary about the media being shared. Additionally, the user devices may include personal computers (e.g., desktop or laptop computers) as well as other media platforms such as TVs, mobile phones, Digital Video Recorders (DVRs), or personal media players (e.g., MP3 or video players). For example, each user may share television-based media content using a DVR device operable for communications via a network with other user devices (whether similar or different, such as other DVR devices, personal computers, personal video players, and so on).

For the sake of convenience, at times, videos are used and described as examples of media content and media objects manipulated by the exemplary devices, interfaces, and methods; however, those skilled in the art will recognize that the various examples apply similarly or equally to other media objects, subject to appropriate modifications and use of other functions where appropriate (e.g., viewing and controlling a media object may apply to viewing a video file (with or without audio), listening to an audio file, such as a soundtrack, or combinations thereof).

FIG. 1 schematically illustrates an exemplary system and environment for communication between two user devices 110 for sharing media content such as time-based media objects. In particular, FIG. 1 illustrates two user devices 110, which may communicate with each other for sharing media objects, and which may further communicate via network 112 with one or more of a media source 120, web server 122, and an advertisement server 130.

In one example, user devices 110 each include suitable communication logic 102 to interface and communicate with other devices 110 as well as media source 120, web server 122, and the like, via network 112 (in part or in whole). For example, communication logic 102 may cause the communication of (and/or receive) a command (e.g., a user entered command such as play, pause, or fast-forward) and a metric reference (e.g., time or frame) associated with the shared display of a media object with other devices 110. Additionally, user devices 110 include control logic 104 for controlling the display of media content associated therewith in response to such commands (generated by the user device itself in response to user input or by other user devices in communication therewith).

Each user device 110 is further operable to display an interface (see, e.g., interface 200 of FIG. 2A) for displaying and controlling media objects in a synchronous manner, which may be caused by logic executed locally by user device 110, e.g., via a plug-in or applet downloaded or installed on user device 110, or remotely, e.g., by initiating a servlet through a web browser from web server 122. Further, logic, located either locally or remotely, may facilitate a direct or indirect connection between user devices 110 (i.e., between Device A and Device B) for sharing media content. For example, a direct IP to IP (peer-to-peer) connection may be created between user devices 110 or an indirect connection may be created through a media server, e.g., media server 122, for streaming the media content to user devices 110. In either case, a communicative connection is established between user devices 110 to relay commands and metrics for the synchronous display and control of a shared media object.

Further, user devices 110 may include logic for receiving and loading data conforming to any media format, e.g., still image (e.g., JPEG, TIFF), video (e.g., MPEG, AVI, Flash), or audio (e.g., MP3, OGG). It is noted that when sharing a media object, the format in which they are displayed need not be identical; for example, a first user device 110 may display a media object via an MPEG player and a second user device 110 via a Flash player.

User devices 110 may include suitable hardware and software for carrying out the described functions; such as a processor connected to an input device (e.g., a keyboard), a network interface, a memory, and a display. The memory may include logic or software operable with the device to perform some of the functions described herein. The device may be operable to include a suitable interface for a messaging facility, such as an email inbox, instant messaging (IM), short messaging service (SMS), multimedia messaging service (MMS), and the like. The device may further be operable to display a web browser for accessing the Internet or user accounts, including webmail environments such as a Yahoo!® mail account or Hotmail® account, for example. User devices 110 may further include a wireless application protocol (WAP) feature, or other data communication protocol associated with user device 110 suitable for communication via network 112.

Network 112 may include a Wide Area Network (WAN) such as the Internet, a wireless network, such as a wireless gateway, e.g., a cellular, satellite, or other wireless network, a non-wireless network such as a cable or fiber optic network, or a combination of wireless and non-wireless systems. User devices 110 may communicate, in part or in whole, via wireless or hardwired communications, such as Ethernet, IEEE 802.11b wireless, or the like. Additionally, communication between user devices 110 and a media source 120 may include (or access) various servers or devices such as advertisement server 130, mail server (not shown), mobile server (not shown), and the like.

Media source 120, web server 122, and/or advertisement server 130 may include logic for receiving user credentials, user input, context information, media objects, and the like. To that end, media source 120, web server 122, and/or advertisement server 130 may utilize various wireless or Web data interface techniques such as Common Gateway Interface (CGI) protocol and associated applications (or "scripts"), Java® "servlets", e.g., Java® applications running on a wireless server, Web server, or the like to present information and receive input from user devices 110. Media source 120, web server 122, and/or advertisement server 130, although described herein in the singular, may actually comprise plural servers, computer, devices, and the like, communicating (wired and/or wireless) and cooperating to perform some or all of the functions described herein. Additionally, media source 120, web server 122, and/or advertisement server 130 may implemented in various fashions and include various hardware, software, or firmware to carry out the examples described herein.

Additionally, advertisement server 130 may operate to deliver advertisements to users devices 110. For example, advertisement server 130 may include logic for causing advertisements to be displayed with or associated with delivered media content based on various factors such as the media content accessed or delivered. In other examples, the advertisements may alternatively or additionally be based on user profile information associated with user devices 110 (e.g., accessed via user devices 110 or web server 122). In yet other examples, the advertisements may be randomly generated or associated with user devices 110.

Figure 2A:
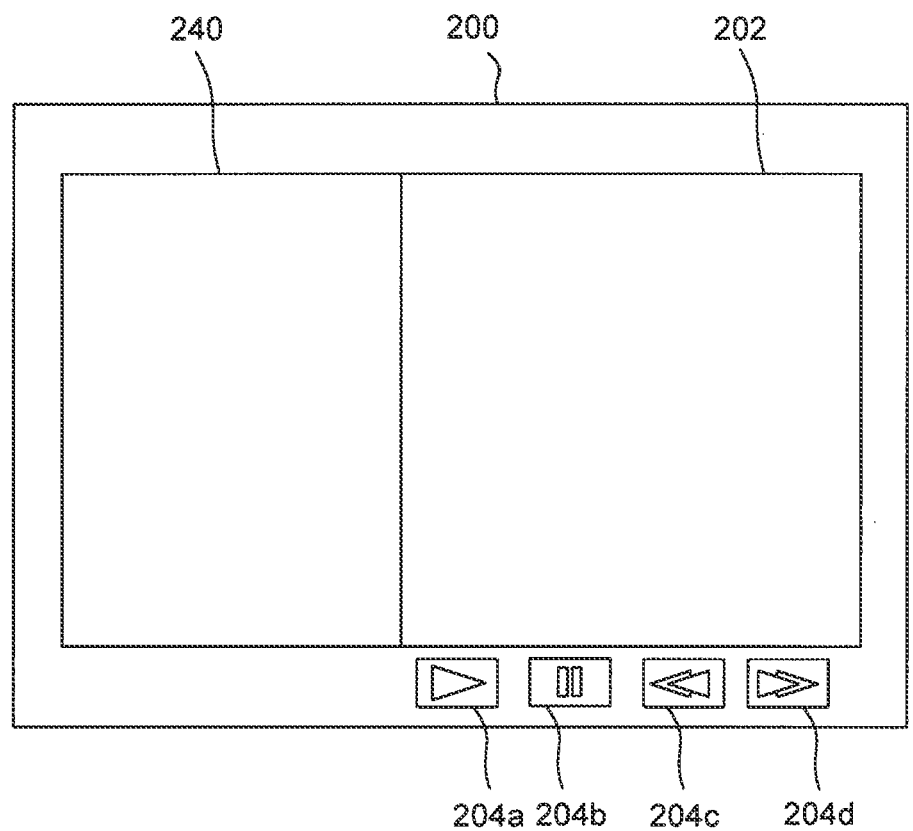
FIG. 2A schematically illustrates an exemplary interface for displaying and controlling the synchronous delivery of a time-based media object.
Figure 2B:
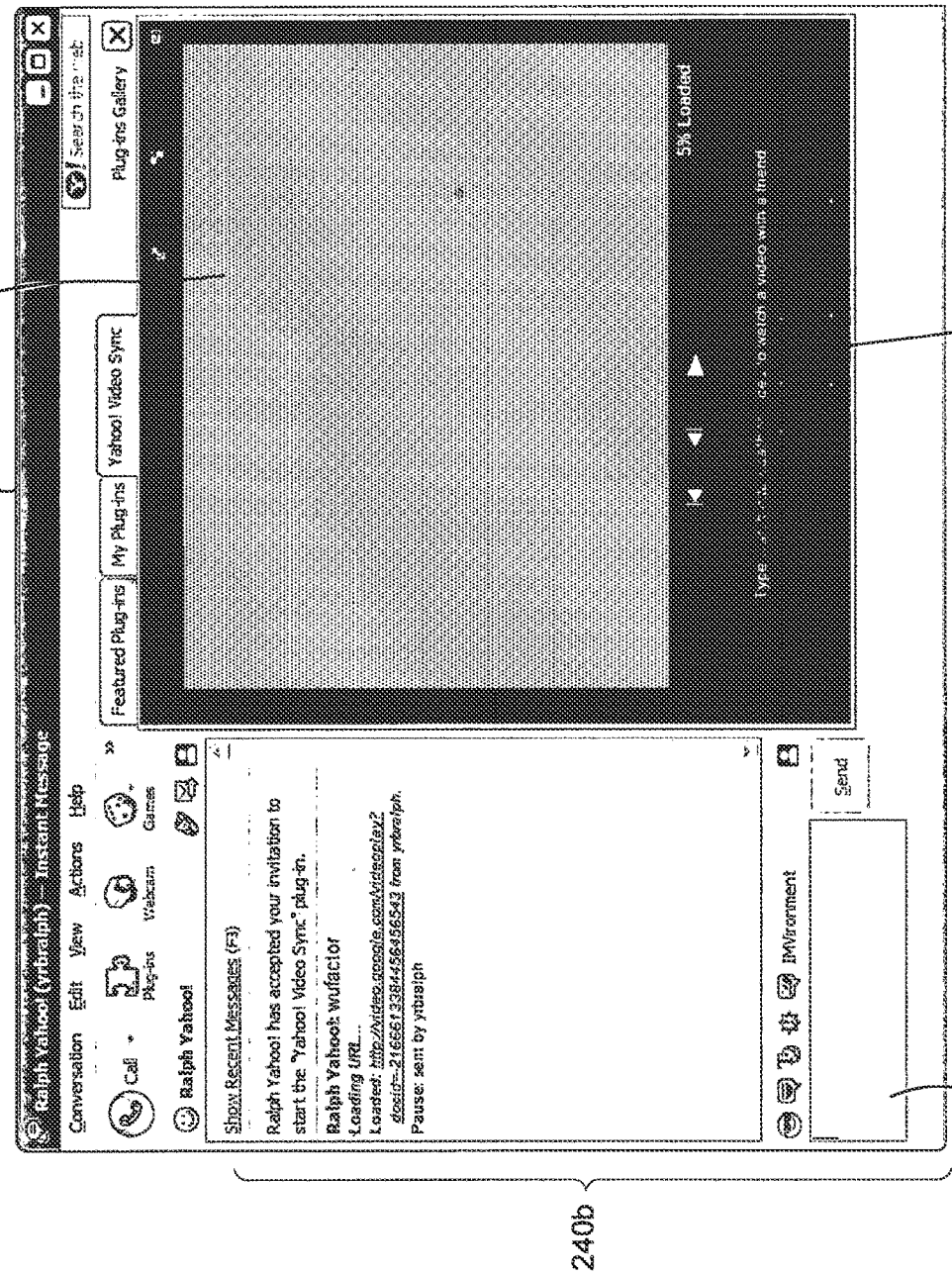
FIG. 2B illustrates a screen-shot of an exemplary interface for displaying and controlling a time-based media object in conjunction with an instant messaging application.

FIG. 2A schematically illustrates an exemplary interface 200 for displaying and controlling the synchronous delivery of a time-based media object; and FIG. 2B illustrates a screen-shot of an exemplary interface 200b for displaying and controlling a time-based media object in conjunction with an instant messaging application (and may be referenced in conjunction with FIG. 2A).

Interface 200 generally includes a display portion 202 for displaying a media object, e.g., a video file. In other examples, a media object may include an audio file such that display portion 202 is not used to display images associated with the received media object. In such instances, display portion 202 may include a status bar indicating the time of an audio file as it plays, e.g., the time into or remaining in an audio file.

Interface 200 further includes controls 204a-204d for controlling the display of a media object in response to user selection. Controls 204a-204d may include controls for play, pause, fast-forward, and rewind as shown. Other controls are contemplated, such as a control for slow-motion, skip N seconds back/forward, stop, and so on.

Interface 200 further includes or interacts with communication logic for communicating user entered commands to other user devices sharing the media object. For example, in response to a user selection of "pause," interface 200 causes the command to be communicated to other user devices sharing the media object. Further, a metric reference associated with the command for controlling the display of the media object (e.g., a time or frame number) is communicated to other user devices for performing the command in a synchronized manner. For example, continuing with the exemplary "pause" command; interface 200 will communicate to a second user device the command "pause," as well as the time, e.g., at 10 seconds (or at frame 550). The command along with the metric will result in the other user devices performing the pause command at the specified time. If the other user device(s) are beyond the specified metric the display will seek or jump back to the specified time and pause; on the other hand, if the other user device(s) have not reached the specified metric the display will continue and pause when the metric is reached.

Additionally, user interface 200 may include a communication portion 240, e.g., which may display a conversation window associated with an instant messaging application or other social or collaborative application. In one example, a user may additionally or alternatively control the display of the media object in display portion 202 via text entered commands. For example, a user entering the text "pause" or "play" may cause interface 200 to control the media object in display portion 202 as well as communicate the command to other user devices in communication therewith.

In other examples, communication portion 240 may include a Voice over IP (VoIP) interface, video phone, text messaging interface, a 'smart' DVR remote control, or other collaborative or social applications. Further, communication portion 240 and display portion 202 need not be included with the same window or be displayed at the same time with a user device.

With reference to FIG. 2B, an exemplary screen-shot of another interface 200b is illustrated. Interface 200b is similar to that of interface 200, including a display portion 202b, communication portion 240b and controls 204; accordingly, only differences will be addressed in detail. In this example, communication portion 240b is implemented as an instant messaging application, whereby users may exchange links to media objects, media object files, text, voice, and so on. Further, as described previously, users may enter commands, e.g., typing "pause" or "play" in lower window 242b, the commands operable to control the display of the media object in display portion 202b as well as with a remote device/user.

Interface 200b may further include various other applications associated therewith from editing operations (e.g., clip, grab, cut, etc.) to communication operations (e.g., email, save, share, etc.)

Figure 3:
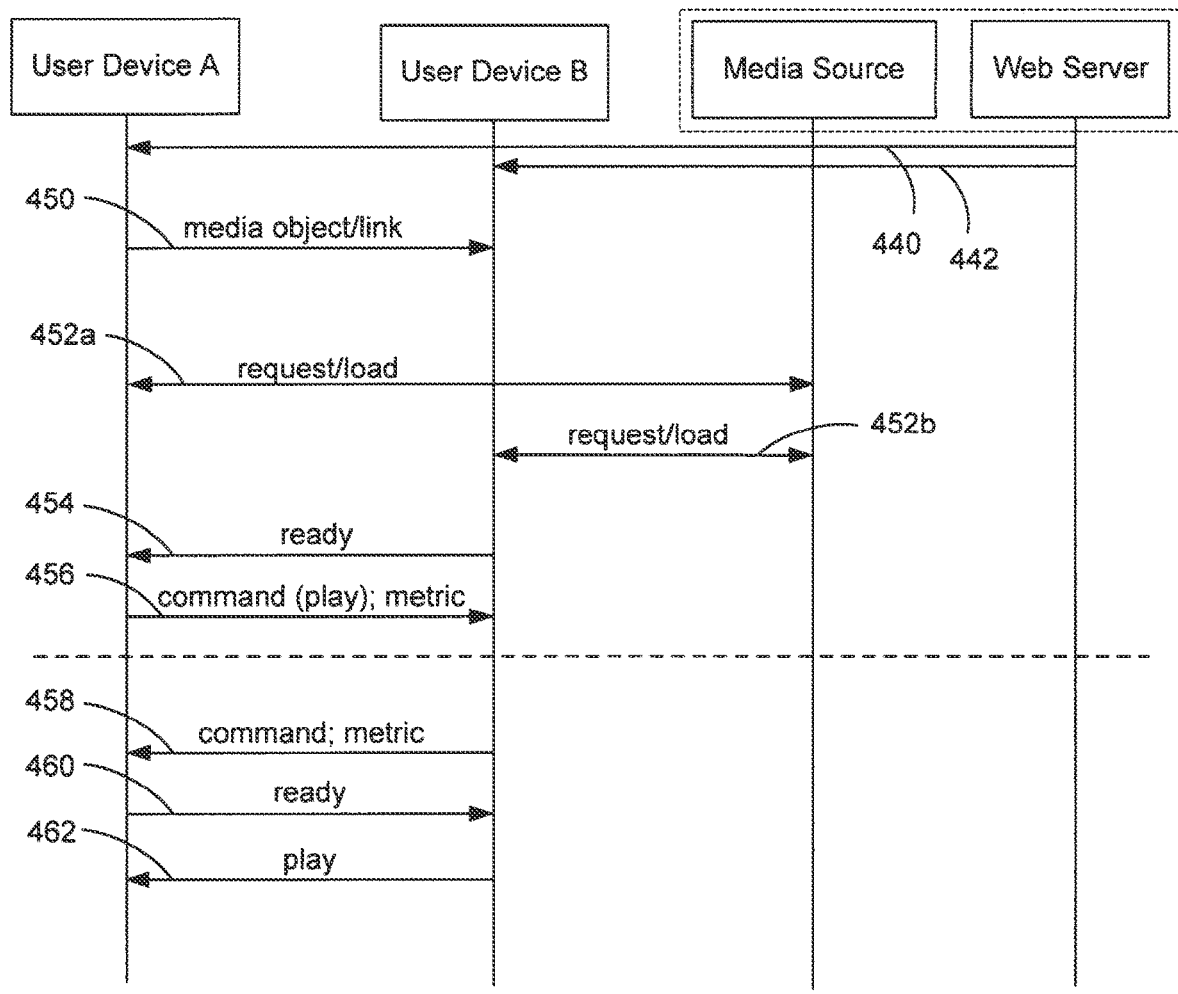
FIG. 3 illustrates an exemplary signaling chart between two users for synchronizing display and control of a media object according to one example.

FIG. 3 illustrates an exemplary signaling chart between user device A and user device B for initiating a sharing session and exchanging a command according to one example. The communications described may be carried out in an environment similar or dissimilar to that described with reference to FIG. 1.

In one example, software for facilitating media delivery and communications between user device A and user device B is received from a web server at 440 and 442. For example, software to be executed locally with user devices A and B, such as a received plug-in or applet for generating a user interface such as user interface 200 of FIG. 2A. Alternatively, a user may initiate a servlet through a web server for facilitating communications between user device A and user device B.

User device A may thereafter communicate an indication to user device B to share a media object at 450. For example, user device A may communicate a link to a media object accessible by user device B. The link may be to a media object of a remote media source (e.g., a media server) or to a media object located with user device A. Additionally, user device A may communicate the media object itself to user device B initially or in response to acceptance by a user of user device B.

In one example, user device A may send user device B a reference or file associated with the software for displaying an interface for facilitating the synchronous media display between user devices A and user B and a desired shared media object. Further, before or after sending a reference or file for sharing, user devices A and B may open a communication channel, e.g., similar to that for a conventional IM application.

In an example where the media object is located with a third party media source (e.g., a video and/or music sewer), user devices A and B request and receive the media object at 452a and 452b respectively. In other examples, the media object may be transferred from one of user devices A and B to the other (directly or via a remote server) such that both user devices A and B have access to the same media object for synchronous display. For example, the media object may be stored with user device A, which may include a personal entertainment device (such as a MP3 player, iPod™, etc.), a DVR (e.g., a TiVo™, etc.), and so on.

User device B thereafter sends user device A an indication at 454 that user device B is ready to play the media object. It will be understood by those of ordinary skill in the art that user device B need not receive the entire media object data prior to sending such an indication, but merely receive sufficient data to begin displaying the media object.

In response to the indication at 454 from user device B, user device A sends a "play" command at 456 to user device B (when user device A is also ready to play the media object). The command at 456 may further include a metric associated with the command, e.g., corresponding to the begging of the media object. It is noted that in other examples, the ready indication could initiate from user device A and/or the play command from user device B. Additionally, with multiple user devices, user device A may wait to issue the play command until all user devices indicate they are ready.

Additionally, user device A may include a delay in playing the media object locally (e.g., on user device A) to account for communication times to user device B. For example, user device may include a standard delay time or estimate a communication time-based on pinging device B to reduce differences in time created by the communication lag between user device A and user device B, thereby making the display of the media object with user device A and user device B near-synchronous (e.g., a display offset of less than 1 second in one example, and less than 500 ms in another example).

In response to a user entered command (e.g., selection of pause, rewind or skip-back N seconds), user device A causes communication of the command and associated metric (e.g., time, frame number, or the like) to user device B at 458. The communication of the command and the metric allows both user devices A and B to control the display of the media object in a similar fashion and to remain in synchronization. For example, for a pause command delivered with a metric such as the time or frame number that the pause was made by user device A, allows user device B to pause the display of the media object at the same metric reference. Accordingly, the pause will occur at the same point of the media object despite any drifting between users. Subsequent communication of commands, e.g., play, may occur at 460 and 462 (similarly to that described at 454 and 456).

Another exemplary command includes a skip command (e.g., skip forward/backward N seconds). A skip command may be communicated as seek command along with the destination metric. For example, if user device A is controlled by a user to skip back 10 seconds, user device A causes communication of a seek command and a destination metric based on 10 seconds prior to the current position of user device A. Thus, if the devices are slightly out of synchronization they will skip or seek to the same reference point in the media object (but not necessarily both skipping the same amount). Again, user device A and B may communicate similarly to that described at 454 and 456 to synchronize playing after the seek command and will begin playing from the same point of the media object.

Finally, one or both of user devices A and B may periodically update the other device with a status command and metric to determine if the media object is displaying in synchronization on each device. For example, one device may drift out of synchronization over time and a status command and metric may allow one or more of the devices to pause or skip the display and re-synchronize the devices. Of course, absolute synchronization is not necessary, and the system may set a desired tolerance for near synchronized display, e.g., synchronized within less that 1 second or so.

Figure 4A:
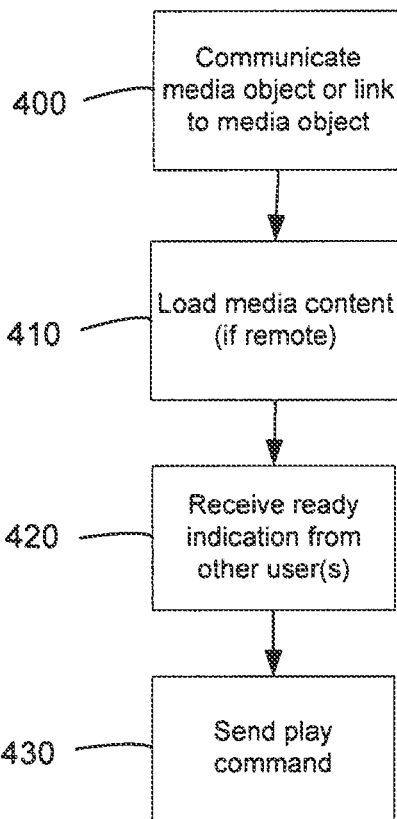
FIGS. 4A and 4B illustrate exemplary methods for synchronizing the display of a media object.
Figure 4B:
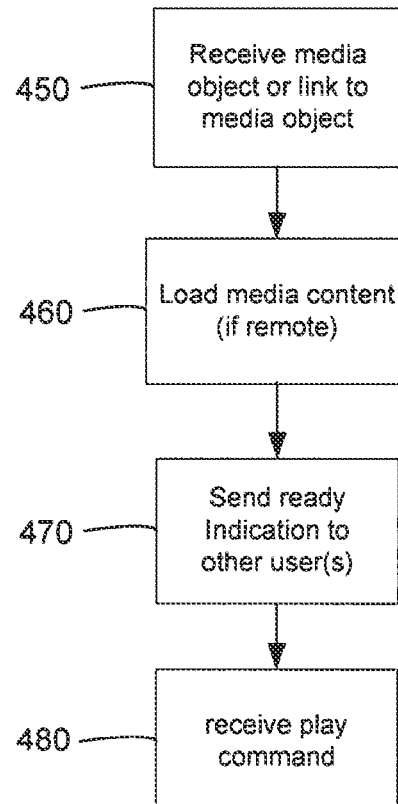

FIGS. 4A and 4B illustrate exemplary methods for sharing content media in a synchronous manner with respect to an initiating device and an invited device. For example, at 400 a first user device may send a media object (e.g., a media object file or a link/reference thereto) to at least one second user device. The first user device then loads the media object at 410 if remote or otherwise prepares the media object for playing at 410. The media object plays when a ready or play command is received from the other user device(s) at 420 (and may also cause a play command at 430 depending on the particular implantation).

The second user device receives the media object or link thereto at 450 and begins to load or access the media object at 460 (the second user may further access or load an appropriate interface for displaying the shared media object). When the media object is sufficiently loaded for playing the second device may signal an indication to the first user at 470 and play the media object in response to a received play command at 480. Again, in other examples, the second user device may wait for a ready signal from the first user and issue the play command to the first user device.

Figure 5:
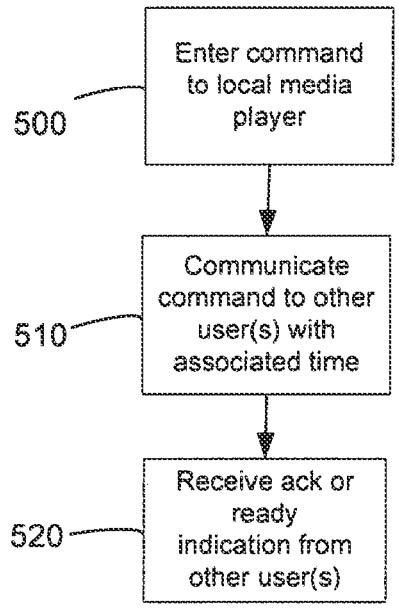
FIG. 5 illustrates an exemplary method for controlling the display of a synchronized media object.

FIG. 5 illustrates an exemplary operation for controlling shared media objects between two or more users. Initially, a command is entered at 500 with a first device. The first device causes the command and associated metric to be communicated to the other device sharing the media object at 510. The first user device may wait for an acknowledgement or ready indication at 520, the acknowledgement or ready indication indicating that the second user device is ready to perform the command entered at 500. For example, the first user device may wait for an acknowledgement or ready indication for a skip forward and backward command before beginning to play at the new time/frame of the media object.

Figure 6:
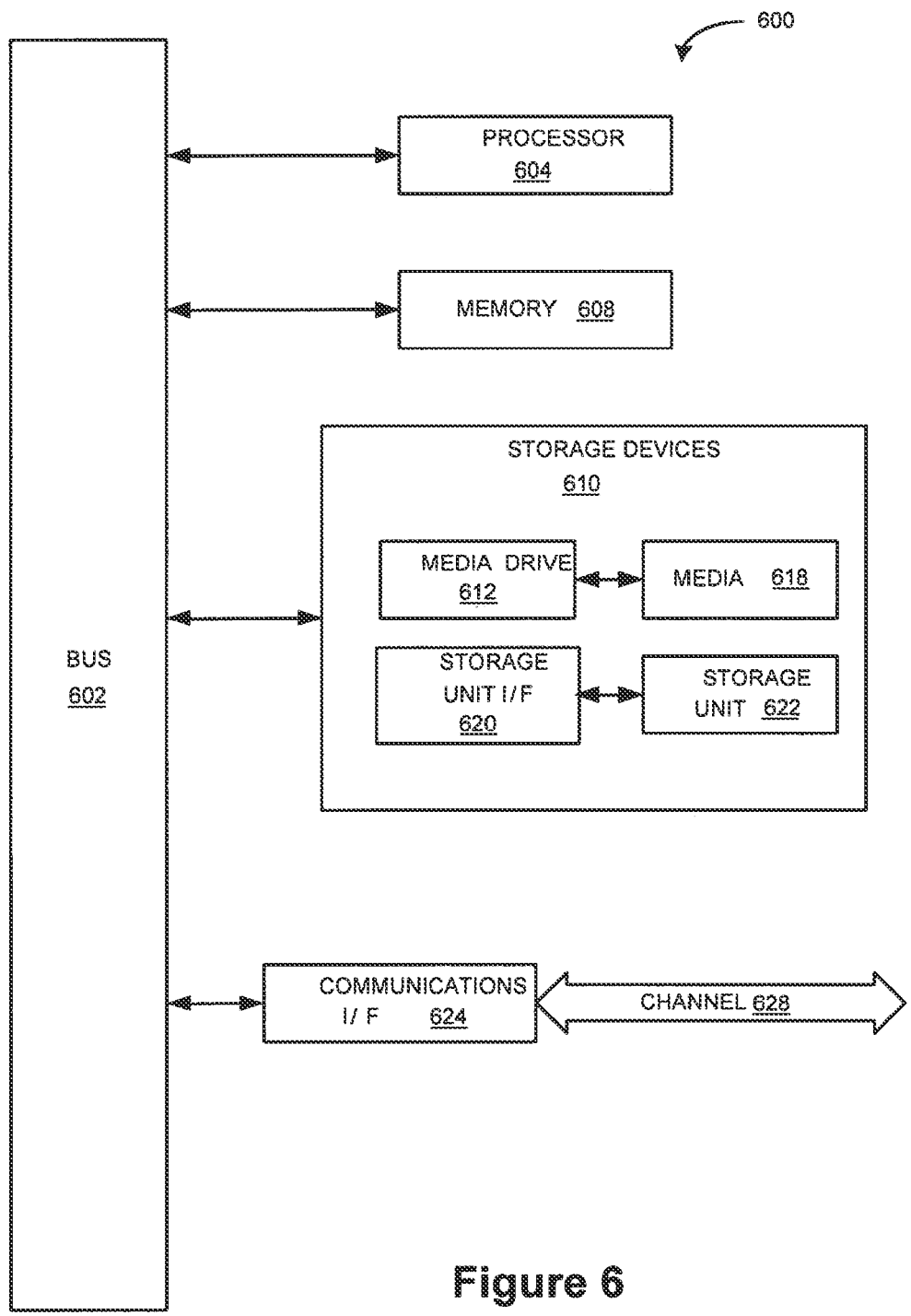
FIG. 6 illustrates an exemplary computing system that may be employed to implement processing functionality for various aspects of the invention.

FIG. 6 illustrates an exemplary computing system 600 that may be employed to implement processing functionality for various aspects of the invention (e.g., as a user device, web server, media source, etc.). Those skilled in the relevant art will also recognize how to implement the invention using other computer systems or architectures. Computing system 600 may represent, for example, a user device such as a desktop, mobile phone, personal entertainment device, DVR, and so on, a mainframe, server, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, preferably random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method for delivery of media content to user devices, the method comprising:
   streaming media content to a first user device of a first user and to a second user device of a second user, the first user different from the second user;
   receiving, during the streaming, user content from the first user device;
   transmitting, during the streaming, the received user content to the second user device;
   receiving, during the streaming, a command from the first user device to control playback of the media content, the command being a command to pause the media content, to fast-forward the media content, or to jump to a particular segment of the media content; and
   synchronously controlling the streaming on the first user device and on the second user device in accordance with the command received from the first user device.

2. The method of claim 1, wherein the media content is video content or audio content.

3. The method of claim 1, wherein the user content comprises text, user voice content, an image, or a link to a media object.

4. The method of claim 1, wherein the command is a command to play the media content, to pause the media content, or to fast-forward the media content.

5. The method of claim 1, wherein the command is a command to jump to a particular segment of the media content.

6. The method of claim 1, further comprising:
   receiving a ready indication from the second user device prior to streaming the media content to the first user device and the second user device.

7. The method of claim 1, further comprising:
   receiving, during the streaming, a command from the second user device to control playback of the media content; and
   synchronously controlling the streaming on the first user device and on the second user device in accordance with the command received from the second user device.

8. A method for delivery of media content to user devices, the method comprising:
   streaming media content to a first user device of a first user and to a second user device of a second user, the first user different from the second user;
   receiving, during the streaming, user content from the first user device;
   sending a link or a reference to the media content to the second user device, wherein the link or reference is a Uniform Resource Identifier (URI);
   transmitting, during the streaming, the received user content to the second user device;
   receiving, during the streaming, a command from the first user device to control playback of the media content; and
   synchronously controlling the streaming on the first user device and on the second user device in accordance with the command received from the first user device.

9. The method of claim 1, further comprising:
   sending, to the second user device, a metric indicating a current position of the media content.

10. A non-transitory, computer-readable medium for providing instructions that, when executed, enable a system to perform operations to deliver a media object to a first user device and a second user device, the operations comprising:
    streaming the media object to a first device and to a second device;
    during the streaming, receiving user content from the first device;
    during the streaming, transmitting the user content to the second device;
    during the streaming, receiving a command from the first device to control a playback of the media object, wherein the command pauses the media object, fast-forwards the media object, or jumps to a segment of the media object; and synchronously controlling the streaming on the first device and on the second device, at least in part based on the command from the first device.

11. The medium of claim 10, wherein the media object is a video file or an audio file.

12. The medium of claim 10, wherein the user content is text, voice content, an image, or a link to the media object.

13. The medium of claim 10, wherein the command plays the media object, pauses the media object, or fast-forwards the media object.

14. The medium of claim 10, wherein the command jumps to a segment of the media object.

15. The medium of claim 10, wherein the streaming is performed, at least in part based on a reception of a ready command from the second device.

16. The medium of claim 10, the operations further comprising:
during the streaming, receiving a command from the second device that controls a playback of the media object; and
synchronously controlling the streaming on the first device and on the second device, at least in part based on the command from the second device.

17. The medium of claim 10, the operations further comprising:
sending a link or a reference to the media object to the second device, the link or reference being a Uniform Resource Identifier (URI).

18. The medium of claim 10, further comprising:
sending, to the second device, a metric indicating a frame number or time interval of the media object.

19. An apparatus, comprising:
a communications interface that streams a time-based media object to a first personal device and to a second personal device, wherein the communications interface receives user content from the first personal device and transmits the user content to the second personal device, during the streaming, and
the communications interface receives a command from the first personal device for controlling a playback of the time-based media object, during the streaming, the command to pause the time-based media object, to fast-forward the time-based media object, or to skip to a reference point of the time-based media object; and
a processor configured to synchronously control the streaming on the first personal device and on the second personal device according to the command from the first personal device.

20. The apparatus of claim 19, wherein the time-based media object is defined by video content or audio content.

21. The apparatus of claim 19, wherein the user content is defined by text, voice content, an image, or a link to the time-based media object.

22. The apparatus of claim 19, wherein the command is to play the time-based media object, to pause the time-based media object, or to fast-forward the time-based media object.

23. The apparatus of claim 19, wherein the command is to skip to a reference point of the time-based media object.

24. The apparatus of claim 19, wherein, in response to a reception of a ready signal from the second personal device, the communications interface streams the time-based media object to the first personal device and the second personal device.

25. The apparatus of claim 19, wherein
the communications interface receives a command from the second personal device, during the streaming, to control a playback of the time-based media object; and
the processor further is configured to synchronously control the streaming on the first personal device and on the second personal device according to the command from the second personal device.

26. The apparatus of claim 19, wherein the communications interface sends a link or a reference to the time-based media object to the second personal device, the link or reference defined by a Uniform Resource Identifier (URI).

27. The apparatus of claim 19, wherein the communications interface sends a metric to the second personal device, the metric indicating a time or frame reference of the time-based media object.

* * * * *